(12) United States Patent
Ruffino et al.

(10) Patent No.: US 8,469,435 B2
(45) Date of Patent: Jun. 25, 2013

(54) TRUCK PAYLOAD STORAGE ENCLOSURE

(75) Inventors: Robin H. Ruffino, Chalmette, LA (US); Herbert Riehl, Erie, CO (US); Jonathan Hart, Salt Lake City, UT (US); George Peter Marse, III, Kenner, LA (US)

(73) Assignee: Failed Levees Applications, LLC, Chalmette, LA (US)

( * ) Notice: Subject to any disclaimer, the term of this patent is extended or adjusted under 35 U.S.C. 154(b) by 67 days.

(21) Appl. No.: 13/198,934

(22) Filed: Aug. 5, 2011

(65) Prior Publication Data
US 2013/0033058 A1  Feb. 7, 2013

(51) Int. Cl.
*B60P 7/02* (2006.01)
(52) U.S. Cl.
USPC ............... 296/100.16; 296/37.6; 224/403
(58) Field of Classification Search
USPC ...... 296/37.6, 39.2, 100.16, 100.18; 224/402, 224/403, 404, 498; 383/97; D12/423, 414, D12/414.1, 416, 406, 412, 409, 410, 425; D6/513–514, 552, 559, 567, 317–319; D32/35, D32/58
See application file for complete search history.

(56) References Cited

U.S. PATENT DOCUMENTS

| | | | |
|---|---|---|---|
| 4,718,583 A | 1/1988 | Mullican | |
| 5,378,034 A * | 1/1995 | Nelsen | 296/39.2 |
| 5,868,295 A | 2/1999 | Carriere | |
| 6,105,842 A | 8/2000 | Cesare | |
| 6,543,659 B2 | 4/2003 | Blair | |
| 6,595,568 B1 * | 7/2003 | Schroeder et al. | 296/39.1 |
| 7,178,851 B1 * | 2/2007 | Gridley | 296/39.1 |
| 2002/0162869 A1 * | 11/2002 | Blair | 224/404 |
| 2007/0018444 A1 * | 1/2007 | Gibson | 280/759 |

* cited by examiner

*Primary Examiner* — Lori Lyjak
(74) *Attorney, Agent, or Firm* — nolaIP, LLC; Neil Coig

(57) ABSTRACT

The present invention is an apparatus for providing a removable, durable enclosure for the contents of a payload storage area, providing a cost-effective, removable and efficient solution for protecting the contents of a payload storage area.

4 Claims, 6 Drawing Sheets

TRUCK PAYLOAD STORAGE ENCLOSURE

BACKGROUND OF THE INVENTION

The present invention relates to a movable apparatus for storing items in a truck's payload area, protecting said items from weather, in an easily manufactured and sturdy enclosure.

Light duty and heavy duty pickup trucks account for the majority of vehicles sold in the United States. A significant part of these trucks' utility comes from having a payload bed in the rear of the vehicle. The bed typically consists of a load floor, two fixed sides and a tailgate in the rear to facilitate access to the bed. There is generally no top to the payload bed, which allows for vast flexibility in what may be stored or mobilized by the vehicle, as the bed is not confined by a fixed height limitation, but also prevents proper confinement of the bed for smaller loads. Some methods have been employed to address this issue, such as tonneau covers, camper tops and the like, but these solutions are substantially permanent, this limiting the vehicle's utility in large part, as well as being cumbersome and expensive.

Clear downsides to the current mode of utilizing these payload areas thus exist. While a large amount of flexibility is gained in having no top or roof to the payload bed, this also leaves the payload area, as well as the contents stored therein, essentially out in the open. The consequence of this is the inherent exposure of the content of the payload area. This exposure can be a detriment for many reasons, not the least of which is the exposure of the contents of the payload area to weather, including sun and rain, which can damage the contents contained within the payload area. Additionally, having this area exposed leaves the contents more susceptible to theft because the items are unprotected as well as in plain sight of any would-be thieves. The use of known alternatives, such as tonneau covers and camper tops hinders the long term flexibility of the payload area, in addition to adding significant expense and complication to the payload area. Other solutions, such as truck boxes, are also semi-permanent, heavy, and intrude significantly into cargo space.

The absence of a solution which provides a practical solution for these problems has yet to be developed. The present invention, however, provides a simple, efficient and cost-effective apparatus which addresses the issues of concealing and protecting cargo stored in the payload bed without the costly and cumbersome installation of additional flexibility-hindering apparatuses. The present invention of a payload bed storage enclosure is thus a novel, needed and functional answer to the problems in the field relating to truck bed storage.

All of these aspects of the current state of payload storage lead to an increased need for a revised method of implementation with minimized cost and complexity, all of which the present invention addresses.

OBJECTS OF THE INVENTION

One object of the invention is to provide a payload storage enclosure.

An additional object of this invention is to provide an easily removable payload storage enclosure.

Another object of this invention is to provide a payload storage enclosure which shields its contents from the weather.

Yet another object of this invention is to provide payload storage enclosure which shields its contents from view.

Still another object of this invention is to provide a durable payload storage enclosure.

Other objects and advantages of this invention shall become apparent from the ensuing descriptions of the invention.

SUMMARY OF THE INVENTION

According to the present invention, an apparatus for providing a removable, durable enclosure for the contents of a payload storage area is disclosed, providing a cost-effective, removable and efficient solution for protecting the contents of a payload storage area.

BRIEF DESCRIPTION OF THE DRAWINGS

The accompanying drawings and figures illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Without any intent to limit the scope of this invention, reference is made to the figures in describing the various embodiments of the invention. FIGS. 1 through 8 depict various aspects of exemplary embodiments of the present invention.

The present invention relates to truck payload storage enclosure 100 as pictured in FIGS. 1 through 8. The construction of enclosure 100 is shown making use of a unique two-piece construction, which aids in reducing manufacturing costs and complication. In this way, two single pieces of material can be used to construct enclosure 100. First section 200 and second section 300 are the two main components. These are, in an exemplary embodiment as presented in the Figures, constructed of a tear-resistant, but deformable material, such as tarpaulin-type material, or any number of synthetic fibrous materials in sheet form which are tear-resistant, and ideally water-resistant. These qualities are ideal in the exemplary embodiment to permit enclosure 100 to be foldable, lightweight, portable, and easily transported in and out of the payload area of a vehicle. It also permits the storage of enclosure 100 to be much easier, as the size of enclosure 100 can be reduced drastically for storage of empty enclosure 100 by way of folding, collapsing or otherwise reducing the size of enclosure 100.

Figure 1:
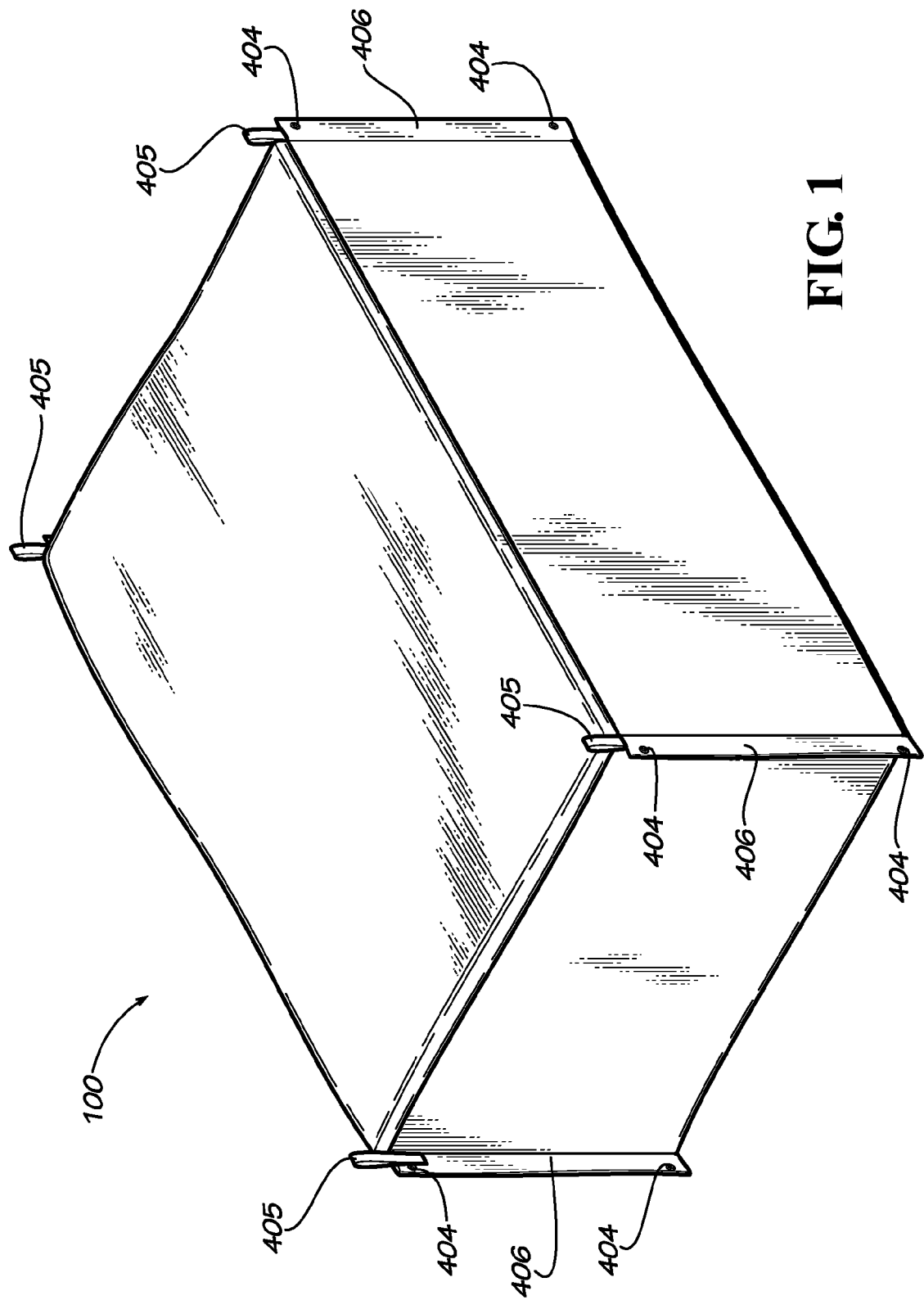
FIG. 1 is a perspective view of the truck payload storage enclosure.
Figure 2:
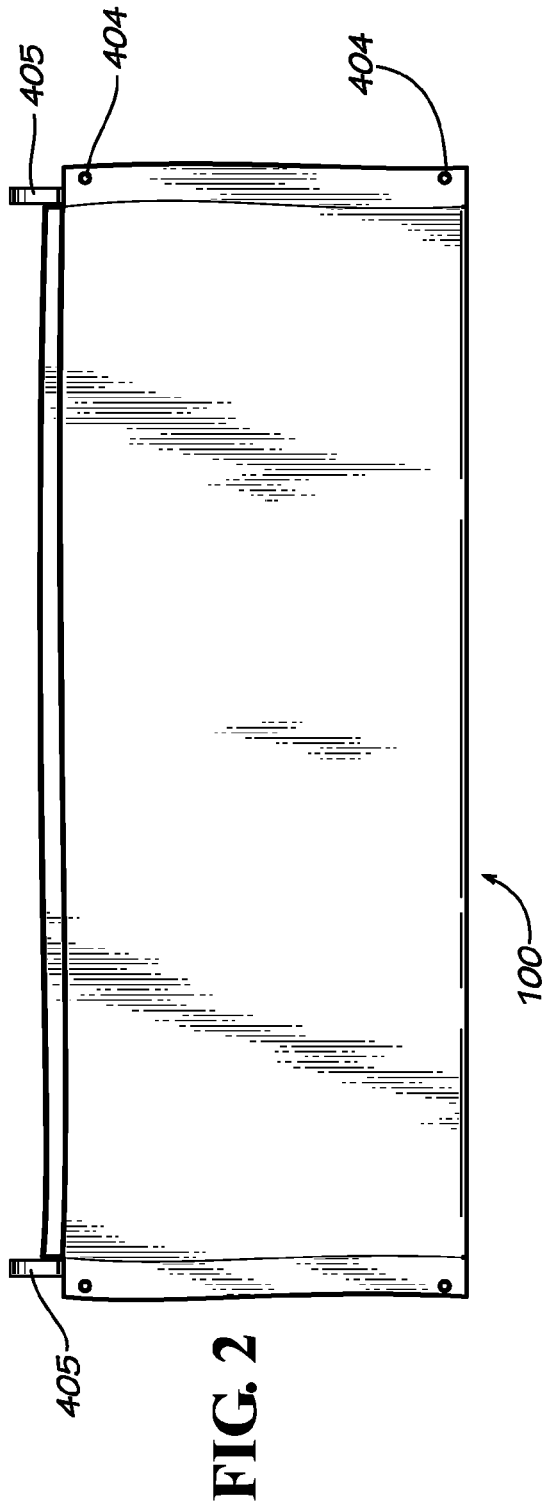
FIG. 2 is a left side view of the truck payload storage enclosure.
Figure 3:
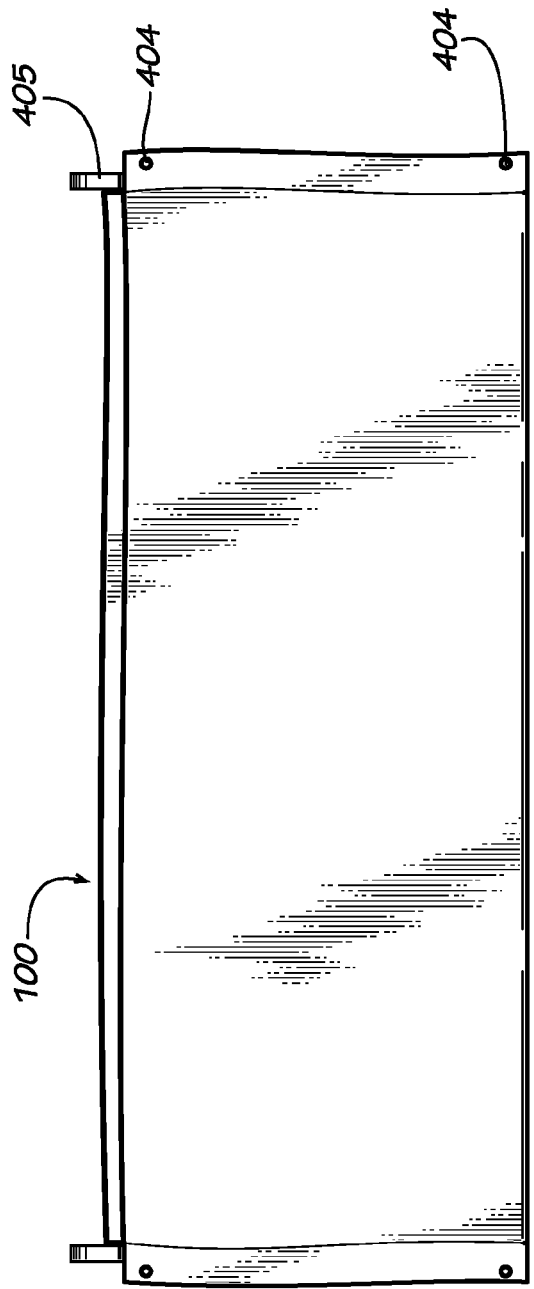
FIG. 3 is a right side view of the truck payload storage enclosure.
Figure 4:
FIG. 4 is a rear view of the truck payload storage enclosure.
Figure 5:
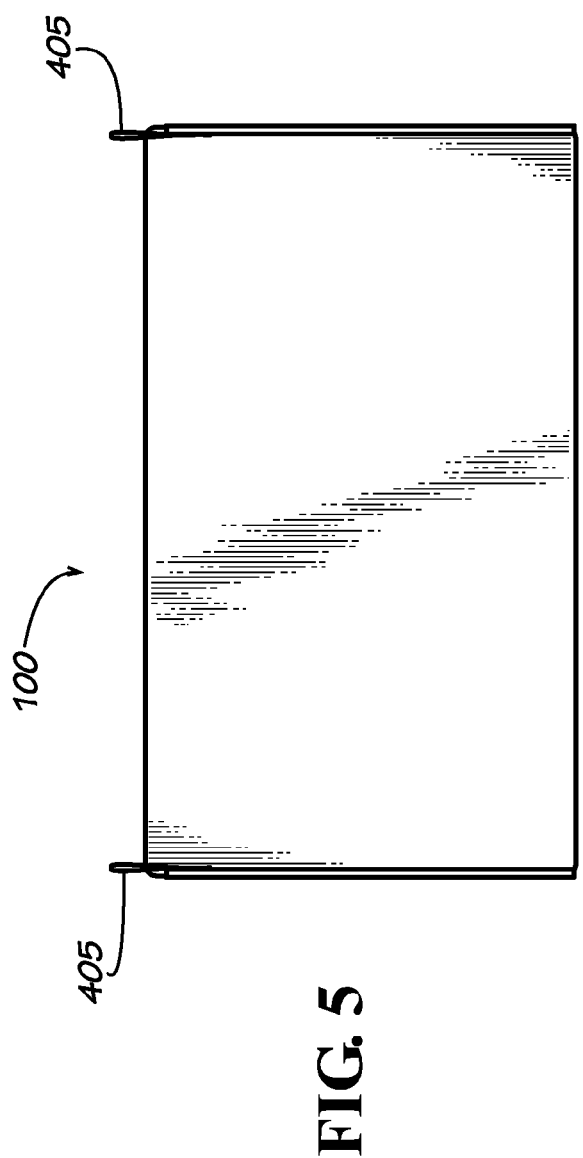
FIG. 5 is a front view of the truck payload storage enclosure.
Figure 6:
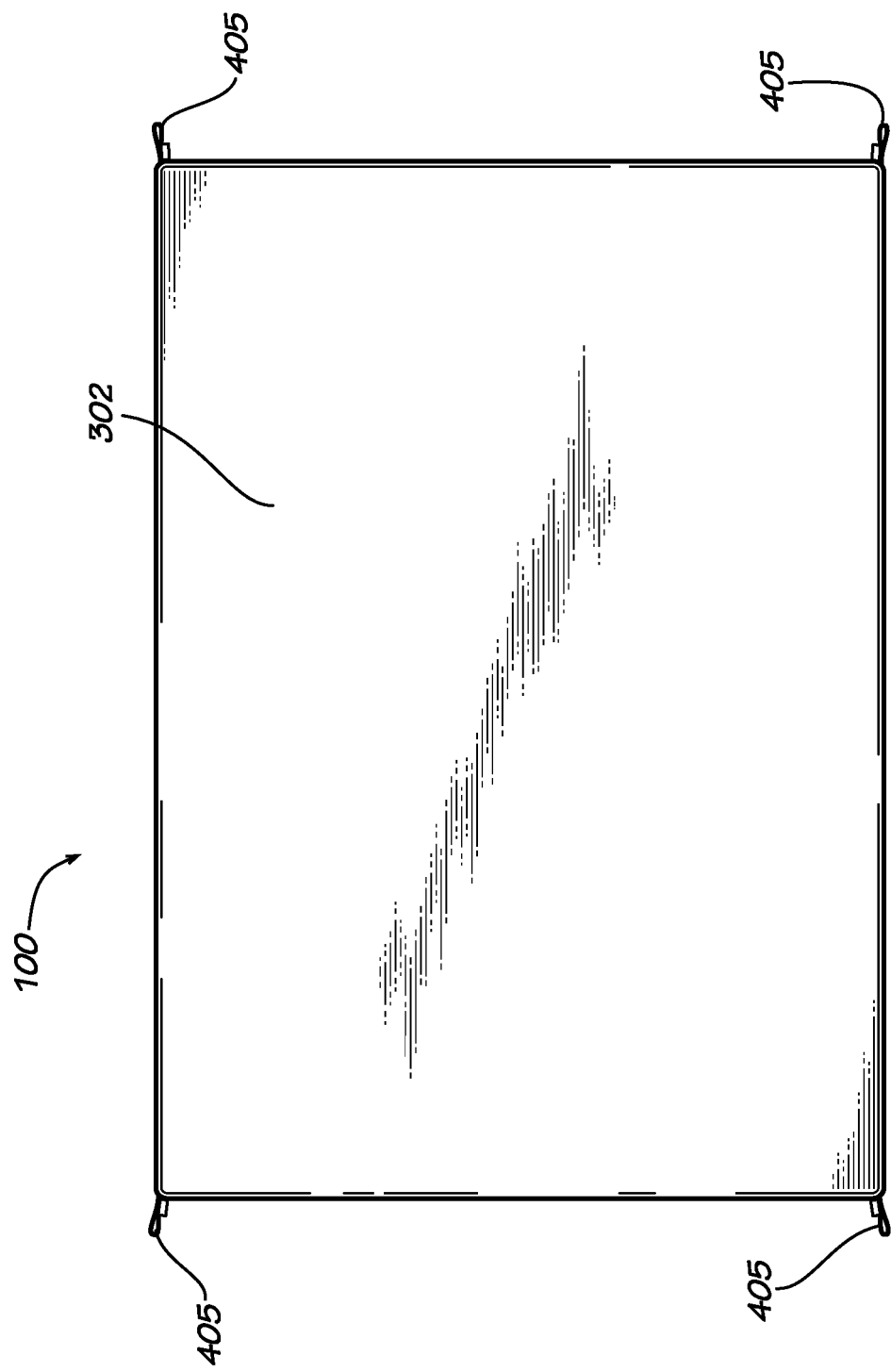
FIG. 6 is a bottom view of the truck payload storage enclosure.
Figure 7:
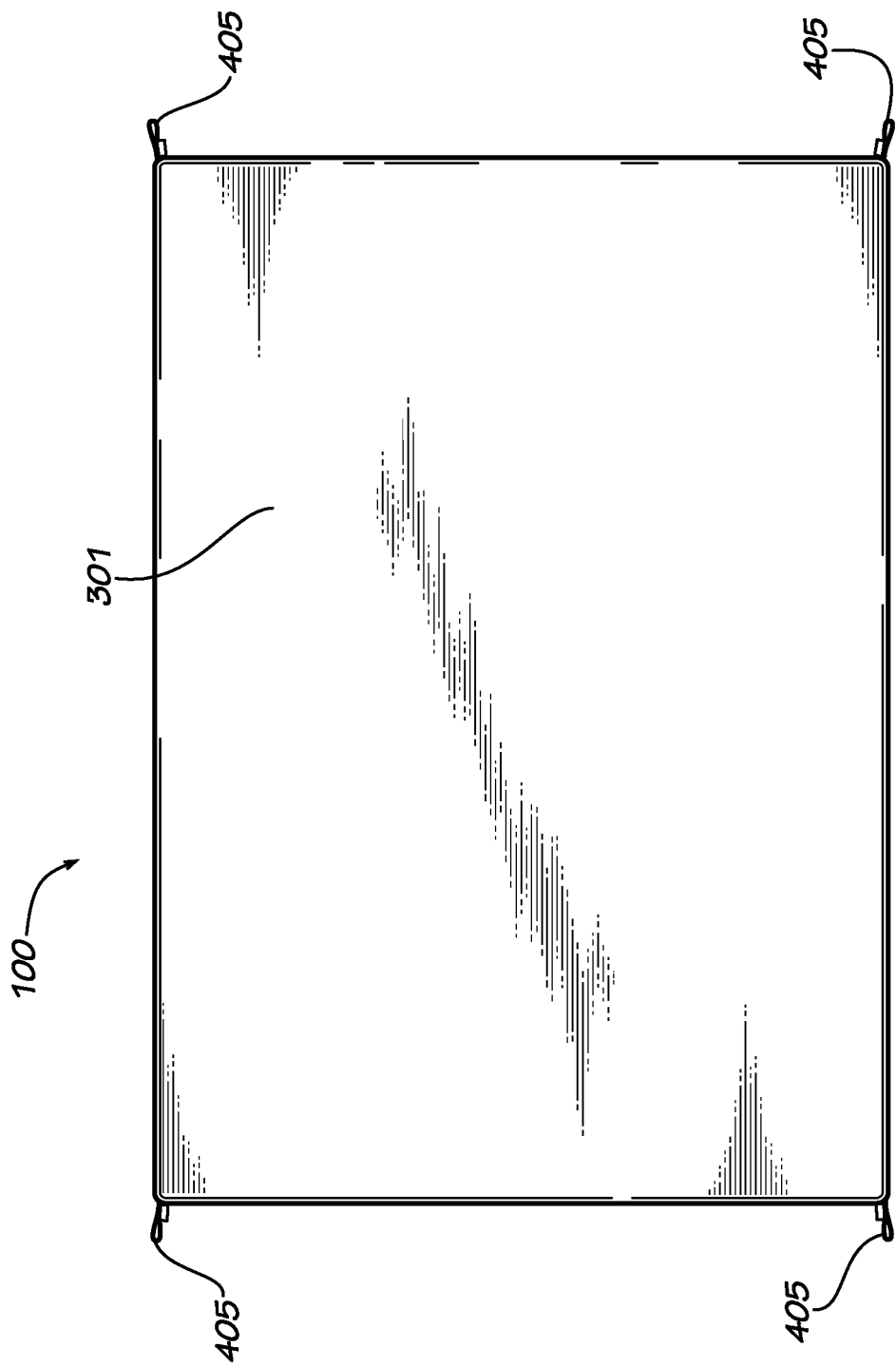
FIG. 7 is a top view of the truck payload storage enclosure.
Figure 8:
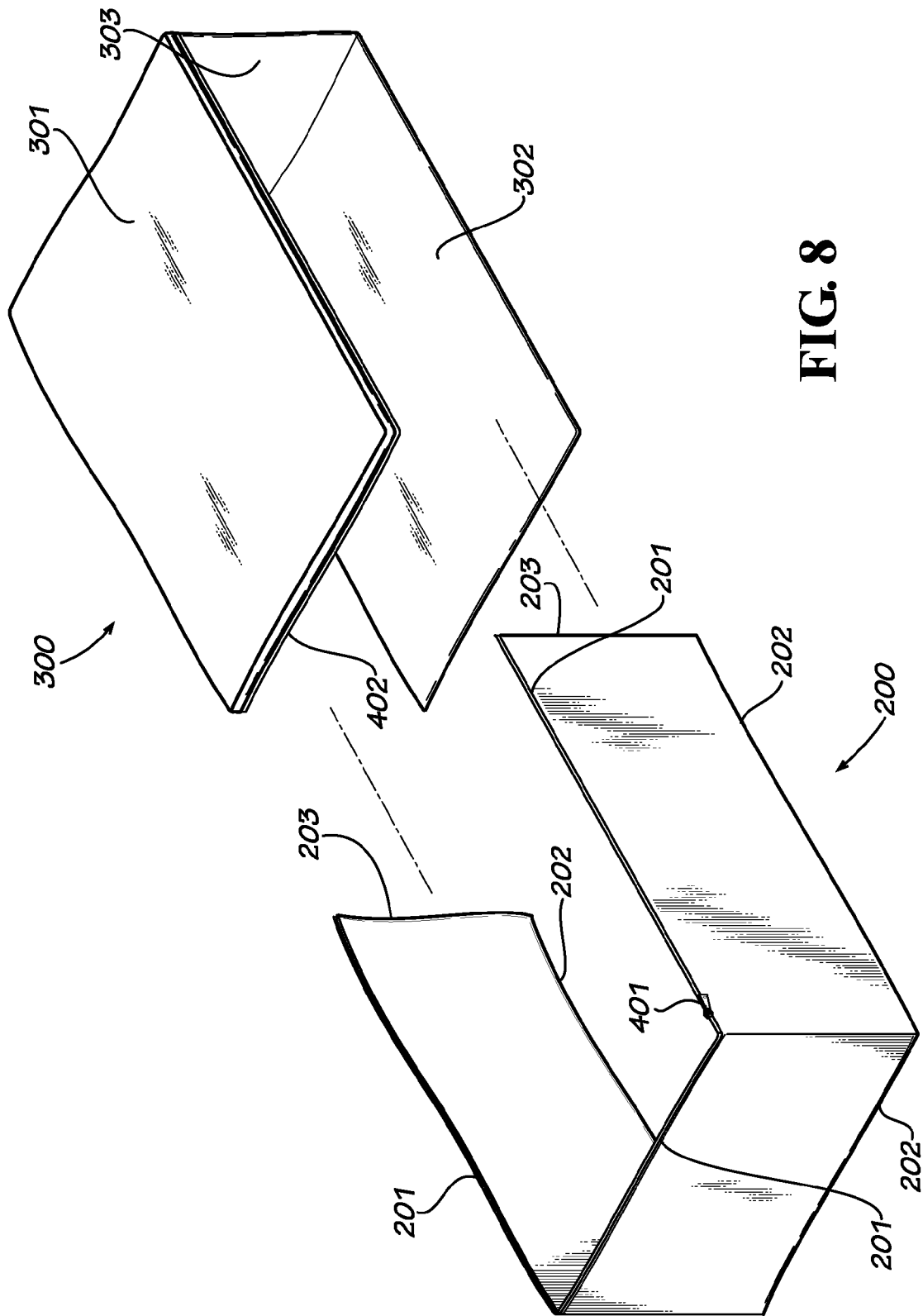
FIG. 8 is an exploded view of the truck payload storage enclosure detailing its two-piece construction.

First section 200 is a generally rectangular shaped swath of material, although different shapes can easily be employed to provide for different shapes and sizes of an enclosure. Second section 300 will mimic the shape and size of first section 200. First section 200 is then folded to resemble a "U" as seen in FIG. 8. The folds are depicted in the Figures as approximately ninety degree angles, but obviously, depending on the type of material, the angle may vary as the material is deformed. First section 200 has top edge 201, bottom edge 202, and two side edges 203, all of which run along the perimeter edge of first section 200. Second section 300, which is largely of identical construction, has differently labeled components for the purposes of illustrating assembly. Second section 300, then, is folded into a "U"-shape, forming top panel 301, bottom panel 302 and back panel 303.

First section 200 and second section 300 are mated by aligning them in a ninety degree relationship to one another and arranging them such that they form a substantially enclosed space, and wherein bottom edge 202 of first section 200 is affixed to bottom panel 302 of second section 300 along the peripheral edges of both sections 200, 300. Additionally, side edges 203 are affixed to back panel 303 along the peripheral edges of both sections 200, 300. This affixation, in the exemplary embodiment, is sewn, however, other methods, such as gluing, stapling or the like may also be employed to join sections 200, 300 together.

To provide an opening for enclosure 100, first mating surface 401 is mounted along top edge 201, and corresponding second mating surface 402 is mounted along the perimeter of top panel 301. In this way, mating surfaces 401, 402 can be joined to complete the shape of enclosure 100. Mating surfaces 401, 402 can be any type of closure, such as a zipper (as pictured in the exemplary embodiment), hook-and-loop fastener or any other fastener similarly utilized which can be mated (closed) and un-mated (opened) as desired.

Once assembled, enclosure 100 is a generally rectangular prism-shaped box, having a plurality of corners 406, but again, different shapes and sizes are possible by varying the shape and size of sections 200, 300.

Additional features of enclosure 100 include swatches of material 403 which are mounted on at least one corner 406 of enclosure 100, or on all corners as pictured in the Figures. Swatches 403 can be of the same material used for sections 200, 300 as described above, or of a different material, such as thick nylon, if desired for strength, or to add a measure of structure to enclosure 100.

Grommets 404 can also be employed by mounting them in swatches 403, or in other convenient locations of enclosure 100. Grommets 404 may then be used to secure enclosure 100 or to attach objects to enclosure 100. Handles 405 are another feature that is shown in the exemplary embodiments of enclosure 100 and can, like grommets 404, be mounted to swatches 403 or in other locations in or about enclosure 100.

In operation, then, a user can employ truck payload storage enclosure 100 by placing enclosure 100 in the payload area of a truck or in an area where cargo is located. Mating surfaces 401, 402 are then un-mated, or opened, to allow a user to fill the interior of enclosure 100 with the desired cargo. Mating surfaces 401, 402 are then mated, or closed, to secure the cargo from the elements and from passers-by. Enclosure 100 can then be moved, using handles 405, placed into the payload area of a vehicle, and optionally secured with tie downs, ratchet straps, or the like to the payload area via the use of grommets 404.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

The invention claimed is:

1. A truck payload storage enclosure comprising:
   a. a substantially rectangular first section of tear-resistant material having at least two folds to create a "U" shape and having along said first section's perimeter a top edge, a bottom edge and two side edges;
   b. a substantially rectangular second section of tear-resistant material having at least two folds to create a "U" shape and forming a top panel, a bottom panel and a back panel, and wherein said second section is operatively affixed to said first section by attaching said bottom edge of said first section to said bottom panel of said second section along the perimeter of said bottom panel, and attaching said side edges of said first section to said back panel of said second section along the perimeter of said back panel; and
   c. a closure mechanism comprising a first mating surface along said top edge of said first section and a second mating surface along the perimeter of said top panel of said second section such that said first mating surface and said second mating surface can be detachably connected to form a substantially rectangular prism having a plurality of corners.

2. The truck payload storage enclosure of claim 1 further comprising at least one swatch affixed to a substantial length of at least one of said corners of said storage enclosure.

3. The truck payload storage enclosure of claim 2 further comprising at least one grommet mounted in said at least one swatch.

4. The truck payload storage enclosure of claim 2 further comprising at least one handle mounted to said at least one swatch.

* * * * *